United States Patent [19]

Hutchison

[11] 4,306,540

[45] Dec. 22, 1981

[54] SOLAR COLLECTOR MOUNTING AND SUPPORT APPARATUS

[75] Inventor: Joseph A. Hutchison, Dallas, Tex.

[73] Assignee: Solar Kinetics, Inc., Dallas, Tex.

[21] Appl. No.: 52,023

[22] Filed: Jun. 25, 1979

[51] Int. Cl.³ .............................................. F24J 3/02
[52] U.S. Cl. .................................. 126/424; 126/438; 350/289; 353/3
[58] Field of Search .............. 126/438, 439, 424, 425; 350/288, 289, 310; 353/3

[56] References Cited

U.S. PATENT DOCUMENTS

| | | | |
|---|---|---|---|
| 1,345,758 | 7/1920 | Folsom | 126/438 |
| 4,027,651 | 6/1977 | Robbins, Jr. | 126/270 |
| 4,133,298 | 1/1979 | Hayama | 126/443 |
| 4,135,493 | 1/1979 | Kennedy | 126/438 X |
| 4,158,356 | 6/1979 | Wininger | 126/438 |
| 4,198,954 | 4/1980 | Meijer | 126/438 |
| 4,202,321 | 5/1980 | Volna | 353/3 X |

Primary Examiner—Larry Jones
Attorney, Agent, or Firm—Hubbard, Thurman, Turner, Tucker & Glaser

[57] ABSTRACT

A solar collector system of the type having a movable surface for receiving solar radiation having improved means for rotatably supporting the movable surface and for rotating the collector surface. A support axle for the collector includes a ball at one end which is carried within a cylindrical sleeve in the solar collector to support the weight of the collector. A torque transmitting arm comprising a flexible flat strip is connected at one end to the axle and at the other end to the collector surface. An improved rotational drive mechanism includes a first sprocket wheel carried on the axle and a second sprocket wheel supported on a support pylon with a drive chain engaging both sprockets. A double acting piston also supported by the pylon is coupled to the chain so that the chain may be driven by a hydraulic control system to rotate the collector surfaces as required. An improved receiver tube support ring is also provided for use with the improved mounting and support apparatus to improve overall efficiency by reducing thermal losses.

15 Claims, 7 Drawing Figures

U.S. Patent  Dec. 22, 1981  Sheet 1 of 3  4,306,540
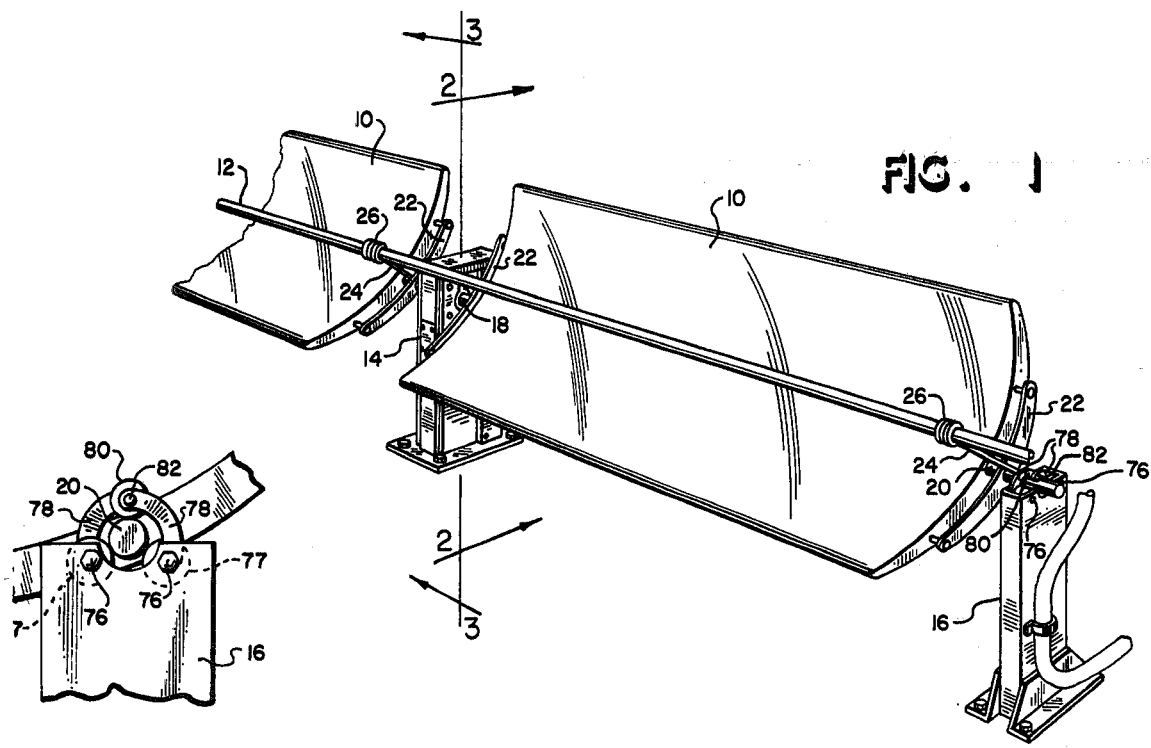
FIG. 1
FIG. 1A
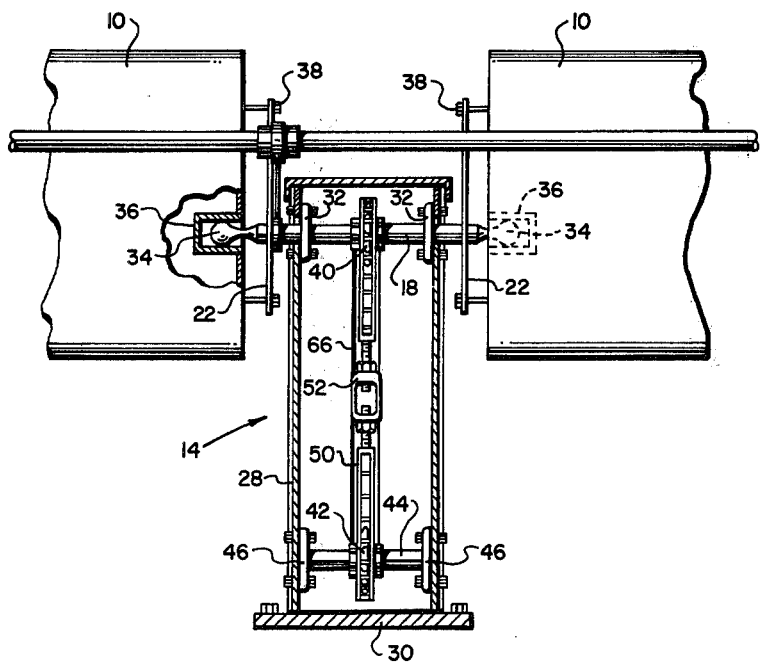
FIG. 2

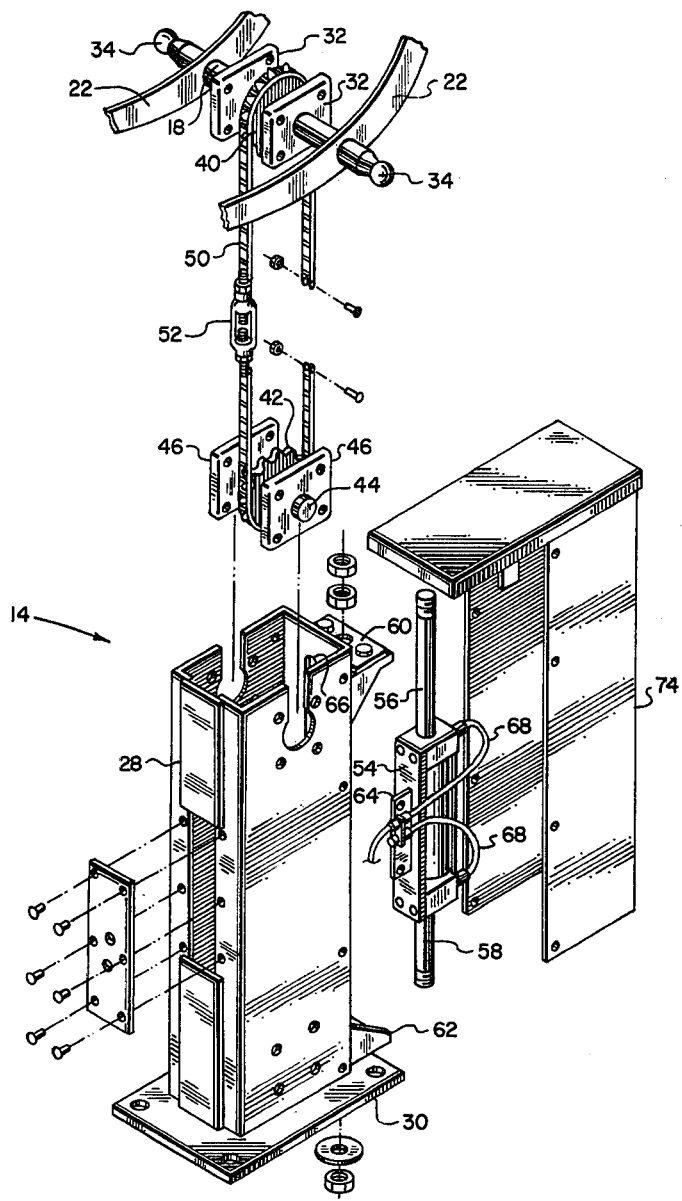
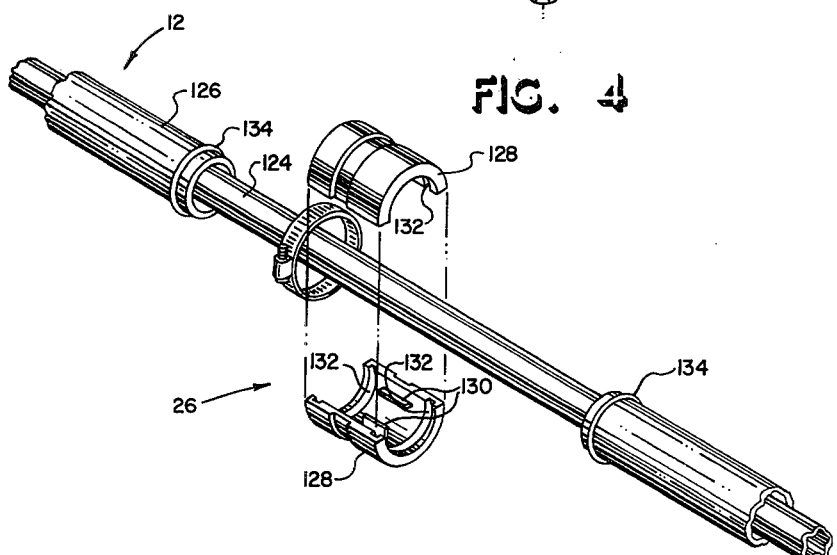
FIG. 4
FIG. 6

SOLAR COLLECTOR MOUNTING AND SUPPORT APPARATUS

BACKGROUND OF THE INVENTION

This invention relates to an improved solar collector system and more particularly to an improved supporting and drive axle arrangement for use with solar collecting panels. In another aspect, this invention relates to apparatus for minimizing energy losses and consumption in movable solar collecting systems and more particularly to improved systems having reduced frictional losses and reduced thermal losses from the thermal receiving tube.

Recent economic and political developments have resulted in a drastic increase in the cost of conventional energy sources such as crude oil, natural gas and the like. Due to the increased prices of conventional energy sources and because of the very real and potential shortages of conventional energy sources such as crude oil, natural gas and the like, many alternative sources of energy are being investigated. One particularly promising alternative source of energy is the recovery and use of solar radiation or "solar energy". While it has long been known that solar energy is a vast untapped source of energy, conventional energy sources such as crude oil, natural gas and the like, have been so cheap that solar energy recovery could not be justified from an economic standpoint. Now, because of the changing economic conditions affecting conventional energy and because of possible shortages of such conventional energy, solar energy represents a viable source of energy.

Many types of solar collector systems have been investigated. Such solar collector systems include tubes, mats and other large surface area solar collectors that contain some type of working fluid that is heated by merely placing such large solar collectors in the sun. Such solar collectors are effective in heating the working fluids only a few degrees above ambient temperature. Additionally, such large solar collectors are relatively expensive. Thus, the use of such large collectors is unattractive because a large capital investment must be made to recover only low grade energy.

Recently, a considerable amount of interest has been directed toward improved types of solar collectors to gather solar energy and concentrate the solar energy into a relatively small area to thereby achieve high temperatures. Such solar collectors usually involve some type of lens or prism reflective means or some type of reflective surface means that will concentrate solar radiation from a relatively large area onto a relatively small target or collector means. The use of highly reflective surfaces or mirror-type surfaces are very effective for gathering solar radiation striking a relatively large effective area and focusing or concentrating the radiation onto a relatively small target area or energy receiver. Such types of solar collectors include a collection of many individual flat mirrors that can be focused onto one small target or energy collector, as well as various types of curved and shaped reflective surfaces that will focus the thus collected solar energy onto a relatively small surface or energy receiver.

One particularly preferred type of solar collector is a parabolic dish reflector which will gather solar radiation and reflect the radiation onto a small target or energy receiver which is located at the focal point of the parabola. Because of the relatively high cost of constructing a true parabolic surface, parabolic dish reflectors are not widely used for low cost energy recovery from the sun.

Recently, parabolic trough reflectors have been investigated as relatively low cost types of solar collectors. The parabolic trough reflectors have proven to be much less expensive to manufacture than parabolic dish reflectors. Some of the most effective parabolic trough reflectors utilize a relatively large reflector surface that is formed by constructing an elongated trough-like means with the walls of the trough having a constant parabolic shape whereby the focal point of the parabolic trough lies along a relatively straight line above the trough. Thus, the concave parabolic trough solar collector can be equipped with a target or energy receiver that is disposed along the line formed by the focal point of the parabolic reflector. By using such a reflector means, solar radiation which strikes the concave surface of the solar collector will be reflected and concentrated onto the focal point of the parabola and can be captured by an energy receiver located at or near the focal point of the parabolic surface.

In order to maximize the amount of solar energy that can be captured using reflector type solar collectors, it has been found highly desirable to utilize a movable solar collector. By using the movable solar collector, as opposed to stationary collectors, the efficiency of the solar collector system can be greatly increased. Thus, the use of movable solar collectors that can be effectively aimed at the sun will greatly increase the overall energy recovery efficiency of the system. In the case of parabolic shaped solar collectors, maximum energy recovery is obtained when the axis of the parabola is aimed directly toward the sun.

Conventional methods and apparatus for supporting and aiming solar collectors toward the sun are rather crude and simple. For example, support means for solar collectors usually include axles or support rods on which the collector means is supported with the axles being journaled into bearing means or bushings whereby the supported reflector can be rotated to presumably point the reflector surface directly toward the sun. This type of apparatus for supporting the solar collector is wrought with many problems. Specifically, it is extremely difficult to install such a type of system in such a manner that the bearings and axle means are in precise alignment. This is extremely critical, especially when the solar collector is quite large and the bearing means are a considerable distance apart. It is, of course, not uncommon to have solar collectors that are up to at least twenty feet in length with the collector surface being supported only at the outer ends by journaling the axle means into bearing means that are carried by pylons that are at least twenty feet apart. Even if the system can be installed with the bearing means being precisely aligned to receive the axle means, problems still exist due to an uneven shifting or settling of the support pylon means. It is, of course, well known that many solar collectors are installed on roof tops. The weight of the solar collectors, as well as varying loads from wind, rain, ice, snow and the like, on the roof structure, will cause support pylons for solar collectors to move and shift to a considerable degree. Such a movement and shifting of the pylons will, of course, cause a misalignment of the bearing means. Still another problem connected with conventional methods and apparatus for supporting solar collectors is due to the fact that varying wind loads on the solar collector structure itself, will often cause bending and twisting forces to be exerted on the solar collector and its supporting axles to cause misalignment of the axles with the bearing means.

Another source of misalignment is the thermal expansion of the solar collectors themselves. The collectors are often made of aluminum which has a relatively relatively high coefficient of thermal expansion. The panels are exposed to daily temperature cycles on the order of 20° F. to 40° F. and annular variations of at least 100° F. The supporting materials, for example the earth, typically has a lower expansion coefficient and is somewhat insulated from ambient thermal cycles. As a result the length of a single 20 foot panel may vary by 0.1 inch or more on a daily basis, and the overall length of a six panel array may vary by 0.6 inch or more on a daily basis. Annual variations may easily be five times as much as the daily variations. These changes in panel length must be taken up in strain in the bearing assemblies or in actual movement of the pylons, either of which can cause misalignment and binding of the bearings.

In all cases where there is even the slightest amount of misalignment between the bearing means and the axles that carry solar collectors, rotation of the solar collectors will become extremely difficult, if not impossible. Thus, even if the system is designed to withstand misalignment of the axles and bearing means, a considerable amount of force and energy will be necessary to cause any desired rotation of the solar collector.

Conventional means for actually causing the rotation of solar collectors to allow them to be aimed at the sun to maximize energy collection utilizes a mechanical drive system. The mechanical drive system will normally be a system of gears that are driven by some type of motor means. The mechanical gears can include a conventional gear train with interlocking cog gears, or a worm gear arrangement can be utilized. Thus, by affixing at least one of the gears to either the axle of the solar collector or to the solar collector structure, itself, and having such gear means, motor means or the like, the solar collector can be selectively aimed at different points in the sky by activating the crank, motor or the like. Unfortunately, such mechanical devices for moving a solar collector simply do not stand up well over long periods of use because the gear mechanism invariably wears and develops "back lash". The wearing of the gear surfaces and the development of back lash will cause an erratic movement of the solar collector as the collector is being pointed toward the sun. This is especially noticeable when the solar collector is exposed to buffeting wind loads. Another problem connected with the use of mechanical drive means occurs in the amount of power that is necessary to drive such mechanical devices. It is often necessary to utilize heavy and expensive variable speed motors. While attempts may have been made to utilize constant speed motors and to periodically activate the motors in response to a command signal, it has been found that the power consumption for the intermittent activation of such motors is quite high. There are several instances where the amount of power required to move the solar collector to track the sun as it traverses the sky often approaches the amount of energy that can be recovered by using the solar collector.

It is thus very apparent that there is a need for an improved support system and system for moving solar collectors. It is also evident that there is a tremendous need for improved solar collector systems that can be installed in locations where the support structure may move and shift without decreasing the efficiency of the system. There is also a need for a support system which allows for some axial movement of solar collectors relative to support axles to eliminate stresses from thermal expansion. It is also evident there is a need for an improved solar collector system whereby the solar collector can be moved in response to a command with very little power usage and without the problems connected with conventional apparatus for moving solar collectors.

SUMMARY OF THE INVENTION

Accordingly, it is an object of the present invention to provide an improved solar collector system of the type having a collector surface which is movable to maintain orientation with the sun.

Another object of the invention is to provide an improved movable solar collector system that can be installed on a surface that is subject to uneven movement and shifting.

Another object of the present invention is to provide an improved solar collector support arrangement which allows limited axial movement of a collector surface relative to a rotation axle.

Another object of this invention is to provide an improved low power drive system for a rotatable solar collector system.

Yet another object of the present invention is to reduce energy losses from a movable reflector solar collecting system by providing improved collector tube mounting apparatus.

An improved solar collector system, according to the present invention, includes a movable collector surface mounted on a rotation axle by improved mounting means and an improved drive mechanism for imparting motion to the rotation axle. The improved mounting means includes a ball carried on at least one end of a rotation axle which is carried within a sleeve socket in the solar collector surface to support the weight of the surface. The mounting system further includes a torque arm comprising a flexible strip having a surface perpendicular to the axle axis with one end of the strip rigidly connected to the axle and a second end of the strip connected to the collector surface. Improved driving mechanism includes a first sprocket carried on a driving axle and a second sprocket rotatably supported on a pylon which also supports the rotation axle and a drive chain engaging both sprockets. The drive system further includes a double acting cylinder carried on the support pylon and coupled to the chain to, in response to a hydraulic fluid control system, drive the chain and thereby rotate the collector surface to maintain alignment with the solar radiation. The system's energy efficiency is further increased by use of an improved collector tube support bracket which reduces thermal energy losses.

DESCRIPTION OF THE DRAWINGS

The present invention may be better understood by reading the following detailed description of the preferred embodiment with reference to the accompanying drawings wherein:

FIG. 1 is a perspective view of a portion of a solar collector panel array constructed according to the present invention;

FIG. 1A is an end view of a portion of an idler pylon of FIG. 1;

FIG. 2 is a cross sectional view along line 2—2 of the drive pylon illustrated in FIG. 1;

FIG. 4 is an exploded perspective view of the drive pylon of FIG. 1;

FIG. 6 is an exploded view of an improved receiver tube support system as illustrated in FIG. 1.

Figure 3:
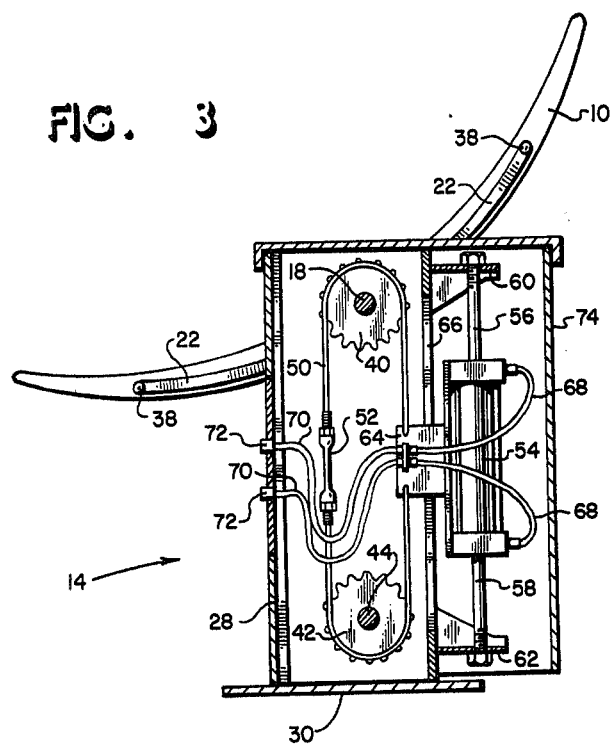
FIG. 3 is a cross sectional view along line 3—3 of the drive pylon of FIG. 1.

With reference now to FIG. 1 there is illustrated a portion of a solar collector array according to the present invention. In such a system, solar energy is reflected from trough-like solar collector panels 10 having an essentially parabolic light reflecting surface. The reflected energy is concentrated at the focus of the parabola and collected by receiver tube arrangement 12 through which a fluid is passed to conduct the heat energy to a utilization point. Pylons 14 and 16 are provided for rotatably supporting the panels 10 and the receiver tube 12 on a suitable base such as the surface of the earth or a roof structure. Rotation axles 18 and 20 are illustrated journaled in the pylons 14 and 16 and supporting the reflector panels 10. Improved coupling means, including flexible torque transmitting arms 22 are provided in the present invention for mounting the reflectors 10 on rotation axles 18 and 20. Details of the mounting structure are described with reference to FIGS. 2, 3 and 4.

In a typical collector panel array, several of the reflector panels 10 are positioned on a series of pylons. For example, a series of six or more panels can be operably connected together in a solar panel array. Generally, one drive pylon 14 is provided at the center of the array while rotational pylon 16 is used in all other positions. Rotational torque from pylon 14 is coupled through the reflectors 10 immediately adjacent the drive pylon to the other reflectors in the linear array. A full collector system usually includes a number of such arrays with a drive pylon 14 provided for each of the individual linear arrays.

The collector tube 12 is also supported on the rotation axles such as axles 18 and 20 by means of a stand-off shaft 24 and a bracket 26 for engaging the collector tube and a surrounding glass tube for providing insulation. Stand-offs 24 and brackets 26 are typically provided at least at each end of each collector panel 10. An improved bracket arrangement 26 is described in more detail below with respect to FIG. 6.

With reference now to FIGS. 2, 3 and 4, the details of drive pylon 14 and the coupling of rotation axle 18 to the reflector panels are illustrated. The drive pylon 14 is constructed primarily from a rectangular steel housing 28 supported on a base plate 30. Suitable holes are provided in base plate 30 for bolting to a concrete foundation or a roof structure and for initial alignment. The axle 18 comprises basically a solid shaft passing through housing 28 and supported therein by a pair of bearings 32. Reflector panels 10 are supported on axle 18 by ball elements 34 carried on each end of axle 18 and by the torque coupling arms 22 also illustrated in FIG. 1. The balls 34 fit within cylindrical sockets 36 in each end of reflector panels 10. The sockets 36 are preferably simple cylinders having an inner diameter only slightly larger than the diameter of the balls 34. That is, the sockets 36 not only allow the balls 34 to rotate relative to the sockets, but also allow axial translation or sliding of the balls 34 within the sockets 36. As a result the balls 34 merely support the weight of reflector panels 10 while allowing pivoting of the panels as well as axial motion of panels 10 relative to the rotation axle 18. The interconnection of panels 10 to axles 18 by means of balls 34 and cylindrical sleeves 36 also does not couple any torque from the axle to the panel. The arms 22 are provided for coupling the torque from the rotation axle 18 to the solar collecting surfaces 10. As illustrated in the Figures, a pair of arms 22 are provided at each end of each of the collector surfaces. Each arm 22 comprises an essentially flap strip of flexible metal extending from axle 18 to a point on the end of each panel 10 displaced from the rotation axis of axle 18. In the preferred embodiment the arms 22 are contoured with the parabolic shape of the reflector surfaces 10 and are positioned on essentially opposite sides of the rotation axle 18. It will be appreciated that a single torque transmitting arm 22 may be used but that the double arm arrangement illustrated is preferred since it reduces stress in the structural members. In any case, each arm 22 has one end rigidly connected as by welding or bolting to the rotation axle 18 and a second end bolted to the collector surfaces 10 by bolts 38. The surfaces of arms 22 are perpendicular to the axis of axle 18 so that the arms are not flexible in a rotational sense. That is, rotation of axle 18 is coupled to reflector surfaces 10 without any lost motion or backlash since there is no rotational flexing of arms 22. But arms 22 are quite flexible in other directions to allow limited axial motion of axle 18 relative to panel 10 and to allow misalignment of the axis of axle 18 with the axis of panel 10.

In this preferred embodiment, the drive mechanism for the drive pylon 14 is basically a hydraulically driven chain and sprocket wheel arrangement. A first sprocket wheel 40 is attached to rotation axle 18 intermediate bearings 32. A second sprocket wheel 42 is fixed to a rotating shaft 44 carried within bearings 46 in the lower end of housing 28. A chain 50 forms an essentially continuous loop passing around both sprocket wheels 40 and 42 and engaging the teeth in both wheels. In a preferred form a tension adjusting turnbuckle 52 is provided in the chain to remove any slack in the system which allows back lash to occur. Alternatively, an adjustable idler sprocket or pulley can be affixed to the pylon structure to engage the chain thereby allowing the chain tension to be adjusted. In the preferred embodiment, chain 50 is driven by means of a double acting hydraulic cylinder 54. Cylinder 54 is carried on upper and lower shafts 56 and 58 respectively, both of which are connected to a piston carried within cylinder 54. Upper and lower brackets 60 and 62 extend from one surface of housing 28 for supporting the upper and lower shifts 56 and 58 respectively. Shafts 56 and 58 are bolted to the brackets 60 and 62 respectively and are rigidly supported thereby. The shafts therefore remain fixed while the cylinder 54 itself is translated by the introduction of hydraulic fluid into the cylinder. A flange 64 extends from one side of cylinder 54 for engaging the chain 50. In the preferred form, flange 64 is provided with two holes through which chain link pins may be passed for coupling the chain to the cylinder 54. Flange 64 is positioned within a slot 66 formed in one side of housing 28. Hydraulic lines 68 from cylinder 54 pass through slot 66 and are rigidly connected at one end to the flange 64. Flexible hoses 70 are connected to the lines 68 at flange 64 and are connected to fittings 72 carried on an external wall of the housing 28. A cover 74 is provided for protecting the top of housing 28 and for encasing the hydraulic cylinder 54.

While in the preferred embodiment a chain and sprocket wheel arrangement was used to drive axle 18 from cylinder 54, other belt and pulley arrangements may also be used. For example a toothed rubber belt may be employed in place of the metal chain. A pulley having teeth or grooves mating with the toothed belt would then be used in place of the sprocket wheel 50. A simple flexible belt or cable may also be employed with smooth pulleys if a double or triple wrap is provided about the pulley carried on axle 18. The belt or cable would preferably be fixed to the pulley on axle 18 on one point to prevent slipping. In any case, even with the chain 50, a smooth pulley may be used in place of sprocket wheel 42 since the flexible belt means does not need to positively engage this wheel.

As noted above, in a typical solar collector array a number of movable solar collector surfaces will be driven by a single drive pylon 14. In such a case, most of the pylons employed will simply provide rotational support for the system and thus, be essentially like pylon 16 in FIGS. 1 and 1A. Pylon 16 may be assembled from portions of drive pylon 14. For example, it may comprise housing 28, rotation axle 18, bearings 32 and balls 34 and flexible arms 22. With this form of support or idler pylon, the solar collector surfaces adjacent pylon are torsionally coupled so that torque may be coupled from the drive pylon and all the collector surfaces will move in unison.

In the preferred embodiment, support pylon 16 is preferably somewhat simpler and especially adapted for facilitating assembly of the collector array. Pylon 16 comprises a rectangular housing similar to housing 28 of pylon 14. A pair of bolts 76 pass through pylon 16 parallel to the axis of rotation axle 20. A roller 77 is carried on each bolt 76 and positioned to support the rotation axle 20 when the axle is positioned on top of pylon 16. A pair of curved retaining arms 78 each have one end pivotally carried on bolts 76 also. When the arms 78 are positioned over the axle 20, as shown in FIGS. 1 and 1A, second ends of each arm are aligned with each other. A third roller 80, identical to the two rollers 77 carried on bolts 76, is carried on a bolt 82 passing through the arms 78 and thereby holding them in closed position. The top roller 80 prevents the axle 20 from accidently being lifted from pylon 16, for example, by a windstorm. As illustrated in FIG. 1, one end 84 of axle 20 is a blank shaft carrying no ball 34 as provided on both ends of axle 18. The opposite end of axle 20 carries a ball 34 and a pair of arms 22 identical with the arrangement provided on both ends of axle 18. The axle 20 of FIG. 1 is therefore suited for supporting the ends of the collector panels 10 at each end of a linear array. In addition, a rotation axle 20 may be employed to couple adjacent solar collector surfaces. When used to torsionally couple adjacent surfaces, the blank end 84 may be rigidly attached to one end of a collector surface 10 as by means of a flange, welding or other arrangement. In such a case, the opposite end of the panel to which blank end 84 is connected should be supported on a non-rigid connection as provided by a ball and arm 22 arrangement taught herein.

Figure 5:
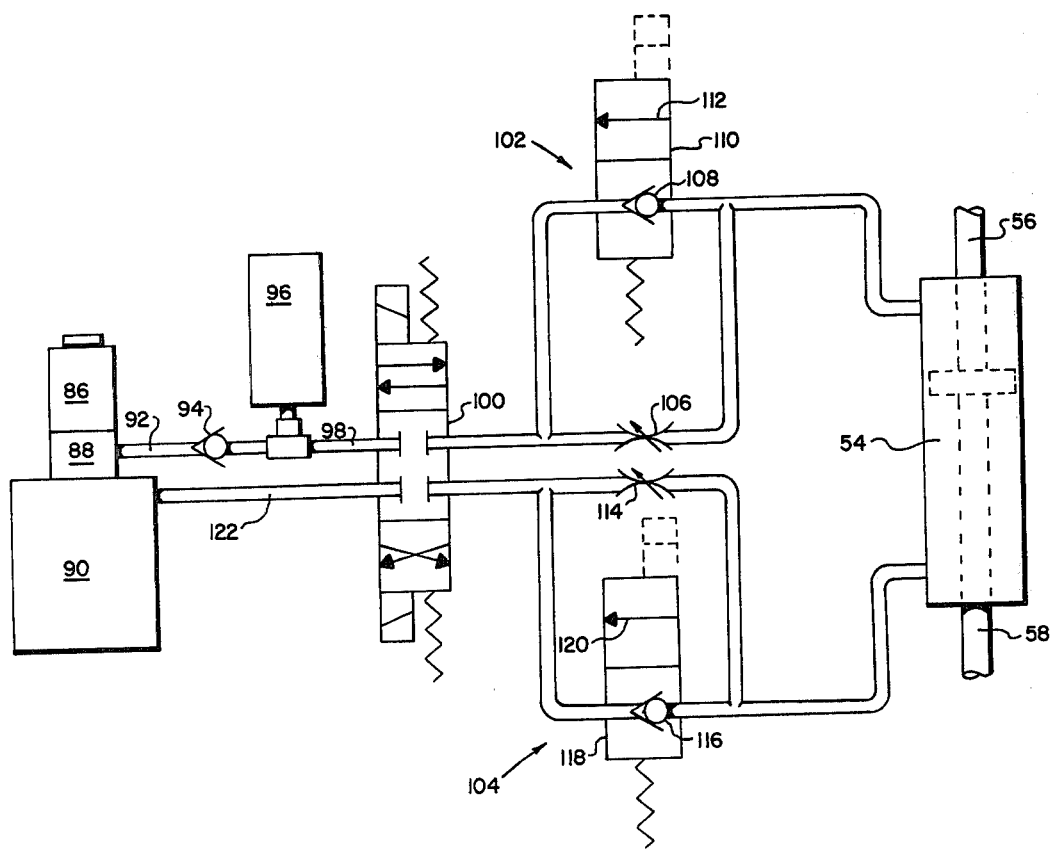
FIG. 5 is a schematic and block diagram of a hydraulic control system suitable for use with the drive pylon arrangement of FIGS. 1 through 4.

With reference now to FIG. 5, there is illustrated a preferred hydraulic fluid supply arrangement for driving the hydraulic cylinder 54. This system includes a high efficiency electric motor 86 driving a hydraulic fluid pump 88 which draws fluid from a reservoir 90 and supplies pressurized fluid to an outlet line 92. A check valve 94 is provided in line 92 to prevent fluid from flowing back into pump 88 during time periods when motor 86 is turned off. A pressurized accumulator 96 is provided for receiving fluid from pump 88 and for supplying pressurized fluid during periods when motor 86 is turned off. A pressure detecting switch is preferably coupled to accumulator 96 and controls the motor 86 to maintain accumulator pressure within a preselected range. Pressurized fluid from accumulator 96 is coupled by line 98 to an inlet to a three position four way valve 100. Valve 100 is solenoid operated and is a conventional four way valve for providing reversal of fluid flow between two lines and also has a center position at which no flow is allowed in any line. A pair of essentially identical flow paths 102 and 104 are provided from the outlet of valve 100 to the two ports of double acting hydraulic cylinder 54. Path 102 includes the parallel combination of a flow restricting valve 106 and a one way flow valve 108 under normal operating conditions. One way valve 108 is one portion of a solenoid operated valve 110 which in a second position provides a continuous unrestricted flow path 112, thereby bypassing the flow restrictor 106. In similar manner, the flow path 104 includes a flow restricting valve 114 connected in parallel with a one way flow valve 116 which is part of a solenoid operated valve 118 also including an unrestricted flow path 120. Valves 110 and 118 are preferably coupled together so that when rapid motion of drive cylinder 54 is desired, both valves switch to the unrestricted flow path condition. When the control system is in its normal operating position, and valve 100 is switched to cause motion of drive cylinder 54, fluid enters the cylinder through one of the one way valves 108 or 116. Fluid leaving the opposite end of cylinder 54 must pass through one of the flow restricting valves 106 or 114. The flow restrictor valves thereby limit the rate of motion of cylinder 54 to a preselected slow rate and additionally insure that high pressure fluid is supplied to the drive cylinder at all times. The fluid leaving the cylinder 54 passes through valve 100 and is returned to the reservoir 90 by return line 122.

The alternate positions of solenoid operated valves 110 and 118 are provided primarily for placing the solar collector surfaces in the protected stow position under emergency conditions. That is, in the event of a sudden hail storm or other dangerous environmental condition, it is desirable to rapidly rotate the solar collector surfaces to a position facing the earth to avoid any damage. The flow control valves 106 and 114 normally limit motion of the drive cylinder to a very slow rate particularily suited to normal operating conditions. The valves 110 and 118 merely provide a means for rapid motion under the emergency conditions. While, as noted above, valves 110 and 118 may be operated in unison by a single solenoid, this is not essential. In one embodiment, separate solenoids are provided so the valves may be operated independently. When cylinder 54 is being driven, only one of the paths 102 and 104 is limiting fluid flow and full speed operations can be provided by bypassing that one path.

With reference now to FIG. 6, details of the collector tube supporting bracket 26 are provided. The heat collecting tube 12 comprises fluid conducting tube 124 having a heat absorbing surface and an outer clear glass tubing 126. A dry gas atmosphere or vacuum is provided between tubes 124 and 126 to limit heat loss by means of thermal conduction from the hot tube 124 to the cooler outer tube 126. The outer tubes 126 are conventionally provided in lengths corresponding to the reflector panels 10 and will preferably be physically supported about the inner tubes 124 without physical contact but in an airtight manner. An annular supporting ring 128 provided in two half sections supports both the inner tube 124 and the glass tube 126 while providing minimal conduction of heat from the tube 124 to the outer surface of the mounting assembly. The ring 128 includes on an inner surface a number of stand-offs 130 which contact and support tube 124. Stand-offs 130 have only a small area in contact with tube 124 and thereby provide a minimal conduction path leading away from the hot tube 124. A pair of inner grooves 132 are provided on each end of ring 128 for holding "O" rings 134 which provide a seal with the outer surface of glass tubes 126. When the spacing ring 128 is assembled, it thereby positions the heat collecting tube 124 in the center of glass tubes 126 and simultaneously provides an air tight seal of the annular space between tubes 124 and 126. The space between the stand-offs 130 provides continuity in the annular space so that dry gas may be pumped into and circulated through the annulus to maintain the desired dry atmosphere or vacuum.

With reference now to the drawings, the assembly and operation of a solar collector field or array in accordance with the present invention will be described. A typical linear array comprises six of the solar collector surfaces 10 positioned in a linear array. For such an array, the initial step is to provide seven suitable foundations for a drive pylon 14 and six of the support pylons 16. The drive pylon 14 is usually supported on the center foundation to reduce the maximum distance between it and the most distant collector surface. The panels immediately adjacent the drive pylon 14 are installed first. It can be seen that this installation step is very simple once the drive pylon 14 including the rotational axle 18 is in place. The panels 10 are merely positioned in alignment with the axle 18 and the socket 36 is slipped over the ball 34. The panel 10 is then rotated until the holes in arms 22 are in alignment with the panels 10 and bolts 38 are secured through arms 22 and into panels 10 to prevent further rotation of panels 10 relative to axle 18 and also to prevent the socket 36 from slipping off of ball 34. In the preferred form, the opposite end of each panel 10 which is adjacent to drive pylon 14 is then connected to a second axle 20 which is then positioned on top of a support pylon 16. As noted above, rotation axle 20 may be installed on the rollers 80 in a very simple manner when the arms 78 are in an open position. Once installed, the arms 78 are closed over the axle 20 and a bolt and roller are used to hold the arm 78 in closed position and prevent lifting of axle 20 from pylon 16. Axle 20 may carry a ball and torsion arm arrangement on its end 84 for supporting the next panel in the same manner as described above. In FIG. 1, pylon 16 is a terminal pylon which also supports a flexible extension of collector tube 12 for conducting the heat collecting fluid to a utilization location.

When the array has been assembled as described above, it not only allows rotation of collector surfaces 10, but minimizes the force required for such rotation by eliminating any binding caused by movement of pylons 14 and 16. In addition, the present assembly prevents binding caused by shifting of pylons 14 and 16 in the direction of the rotation axle axis and by thermal expansion of the collector surfaces 10. The arrangement allows the collector surfaces 10 to move in the direction of the axis of rotation axles without binding because the balls 34 are free to slide axially in the sockets 36. The only resistance to such motion is provided by the torque arms 22 which have sufficient flexibility to allow a limited amount of such motion. While shifting of pylons 14 and 16 may be quite small and would tend to be a slow gradual motion, thermal expansion of the collector surfaces 10 occurs on a daily and annual cycle. Since the panels 10 are typically twenty feet long and are typically made of aluminum, a considerable amount of thermal expansion and contraction can be expected particularly over the range of summer and winter temperatures normally encountered. If rigidly connected axles are employed throughout a linear array of, for example, six collector surfaces, the thermal expansion from end to end of the array would be the cumulative expansion of one hundred and twenty feet of collector surface. The mounting arrangement provided in the present invention provides an effective expansion joint at least at one end of each surface to totally eliminate strains from thermal cycling.

Once an array of collectors 10 has been assembled as described above, a hydraulic drive arrangement such as provided in FIG. 5 is coupled to the cylinder 54 in the drive pylon 14. Other commercially available hydraulic driving systems may be employed such as those using reversible motors to drive double acting cylinders in opposite directions. Though somewhat more complex, the FIG. 5 arrangement is preferred because it is believed to provide the most energy efficient drive system. The hydraulic drive system itself is controlled by some type of tracking sensor for tracking the sun as it traverses the sky. It is well known to use a shadow bar tracking sensor that employs a pair of photo electric cells and a shadow bar to generate signals actuating the hydraulic system when the shadow bar is not aimed directly at the sun. Other tracking systems employing computer generated signals or mechanical timers such as those employed with tracking astronomical telescopes may also be employed to operate the valves of the hydraulic drive system. The exact type of tracking sensor utilized is not part of this invention and any of the known means are suitable.

Various modifications to the apparatus of the present invention will be apparent to those skilled in the art. For example, it is anticipated that a slightly different form of double acting cylinder 54 may be employed in the hydraulic drive system to avoid the use of flexible hydraulic line 70. In particular a cylinder 54 may be provided having hollow shafts 56 and 58 through which hydraulic fluid is conducted to the interior chambers of cylinder 54. With such an arrangement the hydraulic connections are fixed to the ends of shafts 56 and 58 and do not move at all as the cylinder moves. In addition, it would be possible to use a double acting cylinder having a single output shaft if desired although the fixed shaft moving cylinder arrangement of the present invention is preferred. In still another embodiment, a small hydraulic pump and accumulator may be affixed to and carried by the movable cylinder thereby alleviating the need for flexible hydraulic lines for attaching to the cylinder.

While the present invention has been shown and illustrated in terms of specific apparatus, it is apparent that other modifications and changes may be made within the scope of the present invention as defined by the appended claims.

I claim:

1. In a solar collector system of the type having a plurality of movable solar collector surfaces supported on rotation axles which are carried on a plurality of spaced apart support means, improved driving means for rotating said collector surfaces comprising:
    a rotation axle for coupling to a solar collector surface,
    a first pulley means carried by said rotation axle,
    a second pulley means rotatably carried by said support means in alignment with said first pulley,
    a flexible belt means passing around both said first and second pulley means and engaging said first pulley means,
    a hydraulic cylinder supported by said support means and coupled to said belt means, and
    means for selectively adding and removing hydraulic fluid to and from said cylinder to drive said belt means relative to said support and to thereby selectively rotate said solar collector surfaces.

2. Improved driving means according to claim 1 wherein said first pulley means includes sprocket teeth and said flexible belt means comprises a chain engaging said sprocket teeth.

3. Improved driving means according to claim 1 wherein said hydraulic cylinder is double acting and includes a single piston and first and second shafts attached to opposite faces of said piston, said shafts extending from opposite ends of said cylinder, and connected rigidly to said support means.

4. A solar collector system comprising:
    a movable solar collector surface,
    rotation axle means coupled to said solar collector surface for supporting said solar collector surface, and
    means for coupling said rotation axle means to said solar collector surface comprising a ball connected to said rotation axle means, a socket sleeve formed in said solar collector surface internally engaging and permitting axial movement of said ball, and at least one torque coupling arm comprising a flat flexible strip having its surface position substantially perpendicular to the axis of said rotation axle means, said strip having a first end rigidly connected to said axle means and a second end connected to said solar collector surface,
    whereby torque may be coupled from said axle means to said solar collector surface while said solar collector surface is misaligned with the axis of said axle means.

5. Solar collector system according to claim 4 wherein said means for coupling includes two torque coupling arms connected to said axle means in essentially direct opposition to each other.

6. A solar collector system according to claim 4 further including;
    support means supporting said rotation axle means for rotation about the axis of said rotation axle means,
    a first pulley connected to said rotation axle means,
    a second pulley supported by said support means spaced from said first pulley,
    flexible belt means passing around both first and second pulleys and engaging said first pulley,
    hydraulic cylinder means supported by said support means and coupled to said flexible belt means, and
    means for selectively adding and removing hydraulic fluid to and from said cylinder to drive said flexible belt means relative to said support and to thereby selectively rotate said solar collector surface.

7. A solar collector system according to claim 6 wherein said hydraulic cylinder means comprises a double acting cylinder having a pair of shafts connected to opposing faces of an internal piston and extending from each end of said cylinder with each shaft rigidly connected to said support means and said cylinder connected to said flexible belt means.

8. A solar collector system according to claim 6 wherein said first pulley includes sprocket teeth and said flexible belt means comprises a chain engaging said sprocket teeth.

9. A solar collector system according to claim 4 further comprising a heat collecting tube assembly supported by a shaft connected to said rotation axle means to move in unison therewith said heat collecting tube assembly comprising a fluid conducting tube, a plurality of transparent tube sections coaxially spaced about said fluid conducting tube, and bracket means for supporting said fluid conducting tube and said transparent tubes from said shaft,
    said bracket means comprising a section of a cylinder having radially spaced stand-offs on its inner surface for supporting said fluid conducting tube with minimum surface contact, annular seal means on its inner surface near each end for sealingly engaging and supporting ends of adjacent transparent tube sections, and means on its outer surface for connection to said shaft.

10. In a solar collector system of the type having a solar collector surface supported on rotation axles which are supported on spaced apart support means, improved coupling means for connecting said rotation axles to said solar collector surface comprising,
    a ball carried on one end of a rotation axle, a cylindrical sleeve formed in said solar collector surface internally engaging and permitting axial movement of said ball, and at least one torque coupling arm comprising a flat flexible strip position substantially perpendicular to the rotation axis of said rotation axle having a first end rigidly connected to said rotation axle and a second end connected to said solar collector surface.

11. In a solar collector system according to claim 10, improved coupling means comprising a pair of said torque coupling arms rigidly connected to said axle in direct opposition to each other.

12. A solar collector system comprising:
    a movable solar collector surface,
    rotation axle means coupled to said solar collector surface for supporting said solar collector surface,
    means for coupling said rotation axle means to said solar collector surface,
    support means supporting said rotation axle means for rotation about the axis of said rotation axle means,
    a first pulley means connected to said rotation axle means,
    a second pulley means supported by said support means spaced from said first pulley means,
    flexible belt means passing around said first and second pulley means, and
    hydraulic cylinder means supported by said support means and coupled to said flexible belt means, said hydraulic cylinder means comprising a double acting cylinder having a pair of shafts connected to opposing faces of an internal piston and extending from each end of said hydraulic cylinder with each shaft rigidly connected to said support means.

13. A solar collector system according to claim 12 wherein said first pulley means includes sprocket teeth and said flexible belt means comprises a chain engaging saidd sprocket teeth.

14. A solar collector system acccording to claim 12 wherein said means for coupling said rotation axle means to said solar collector surface comprises a ball connected to said rotation axle means, a cylindrical sleeve formed in said solar collector surface internally engaging said ball and at least one torque coupling arm comprising a flat flexible strip having its surface position substantially perpendicular to the axis of said rotation axle means, said strip having a first end rigidly connected to said rotation axle means and a second end connected to said solar collector surface.

15. A solar collector system according to claim 14 wherein said means for coupling includes two torque coupling arms connected to said rotation axle means in essentially direct opposition to each other.

* * * * *